(12) United States Patent
Reinicke et al.

(10) Patent No.: US 11,124,208 B2
(45) Date of Patent: Sep. 21, 2021

(54) SYSTEM AND METHOD FOR THE SUPRAREGIONAL OPERATION OF A VEHICLE

(71) Applicant: SIEMENS MOBILITY GMBH, Munich (DE)

(72) Inventors: Stefan Reinicke, Ilmmuenster (DE); Christian Stroessner, Grossenseebach (DE)

(73) Assignee: Siemens Mobility GmbH, Munich (DE)

( * ) Notice: Subject to any disclaimer, the term of this patent is extended or adjusted under 35 U.S.C. 154(b) by 17 days.

(21) Appl. No.: 16/637,837

(22) PCT Filed: Jun. 7, 2018

(86) PCT No.: PCT/EP2018/065007
§ 371 (c)(1),
(2) Date: Feb. 10, 2020

(87) PCT Pub. No.: WO2019/029860
PCT Pub. Date: Feb. 14, 2019

(65) Prior Publication Data
US 2020/0247438 A1 Aug. 6, 2020

(30) Foreign Application Priority Data
Aug. 8, 2017 (DE) .................... 10 2017 213 803.3

(51) Int. Cl.
*B61L 15/00* (2006.01)
*H04L 12/40* (2006.01)

(52) U.S. Cl.
CPC ....... *B61L 15/0018* (2013.01); *B61L 15/0072* (2013.01); *H04L 12/40* (2013.01); *H04L 2012/40293* (2013.01)

(58) Field of Classification Search
CPC ............. B61L 15/0018; B61L 15/0072; B61L 27/0061; B61L 15/0063; H04L 12/40; H04L 2012/40293
See application file for complete search history.

(56) References Cited

U.S. PATENT DOCUMENTS 3,043,952 A * 7/1962 Reid ................... B61L 3/225
180/168
2017/0217457 A1 8/2017 Fischer

FOREIGN PATENT DOCUMENTS

| CN | 101009679 A | 8/2007 |
| CN | 103746972 A | 4/2014 |
| (Continued) |

OTHER PUBLICATIONS

DB Netz AG: "European Train Control System (ETCS) bei der DB Netz AG", Apr. 2014, pp. 1-20, URL: https://www.deutschebahn.com/resource/blob/1303328/d9556ec0c860abb53cf07bfcb693f79d/Anhang_Themendienst_ETCS-data.pdf.
(Continued)

*Primary Examiner* — Russell Frejd
(74) *Attorney, Agent, or Firm* — Laurence A. Greenberg; Werner H. Stemer; Ralph E. Locher

(57) ABSTRACT

A system for the supraregional operation of a vehicle includes at least one control device. A first vehicle bus can be connected to the control device, wherein a defined number of first control apparatuses can be connected to the first vehicle bus; and a second vehicle bus can be connected to the control device, wherein a defined number of second control apparatuses can be connected to the second vehicle bus. The control device provides for a defined minimum functionality during a moving transition of the vehicle from a defined first region into a defined second region. The control device changes a functionality for the second control apparatuses during the moving transition from the first (Continued)

region into the second region, and the control device is configured to control the coordination of the changing of the functionality of the second control apparatuses.

13 Claims, 1 Drawing Sheet

(56) References Cited

FOREIGN PATENT DOCUMENTS

| | | |
|---|---|---|
| DE | 19758365 A1 | 6/1999 |
| DE | 10223116 A1 | 12/2003 |
| DE | 102004001818 B3 | 8/2005 |
| DE | 102008022343 A1 | 11/2009 |
| DE | 102009025550 A1 | 12/2010 |
| DE | 102014206519 A1 | 10/2015 |
| DE | 102014214228 A1 | 1/2016 |
| EP | 1065127 A1 | 1/2001 |
| EP | 1644235 A1 | 4/2006 |
| EP | 2399802 A2 | 12/2011 |
| WO | 2005007481 A1 | 1/2005 |
| WO | 2012149761 A1 | 11/2012 |

OTHER PUBLICATIONS

DB Netz AG: "European Train ControlSystem (ETCS) bei der DB Netz AG", pp. 1-20, XP055507546, found on the Internet: URL:https://www.deutschebahn.com/resource/blob/1303328/d9556ec0c860abb53cf07bfcb693f79d/AnhangThemendienst Etcs-data.pdf; [found Sep. 17, 2018]; pp. 13; 2014—Statement of Relevance.

\* cited by examiner

SYSTEM AND METHOD FOR THE SUPRAREGIONAL OPERATION OF A VEHICLE

BACKGROUND OF THE INVENTION

Field of the Invention

The invention relates to a system for the supraregional operation of a vehicle. The invention furthermore relates to a method for the supraregional operation of a vehicle. The invention furthermore relates to a computer program product.

The approach, established up until now in railway engineering, of a central vehicle controller that contains superordinate control system functions in a single device, exhibits disadvantages with regard to vehicle approval when using software in cross-border transport.

In order to achieve saving effects when approving vehicles, it often makes sense to use different software in the departure country than in the destination country. For this purpose, when traveling or moving across a border (transition), the vehicle controller has to be reconfigured during the journey, that is to say corresponding software for the vehicle controller has to be exchanged. In the time during which the reconfiguration takes place, essential vehicle functions must remain available if these are necessary for crossing a border.

In known vehicles, required reconfigurations when crossing a border are performed while stationary. Vehicles that contain dedicated hardware, which is activated or deactivated when crossing a border, for the corresponding destination countries are known. Use of monolithic software containing all of the functions of all of the countries to be traveled through in a single item of software is furthermore known.

Official approval for said control software is complex and cost-intensive, in particular in the European approval process involving many different countries, since reapprovals on account of changes of the control software for one country always have to be performed in all of the countries. This thereby creates a risk of software that is already approved in parts of Europe having to be subjected for approval to a further approval authority, the risk then sometimes arising of having to implement functions in a specific and possibly mutually contradictory manner.

SUMMARY OF THE INVENTION

One object of the present invention is to provide improved supraregional operation of a vehicle.

The object is achieved according to a first aspect by way of a system for the supraregional operation of a vehicle, having:
at least a control device;
wherein a first vehicle bus is able to be connected to the control device, wherein a defined number of first control apparatuses is able to be connected to the first vehicle bus; and
wherein a second vehicle bus is able to be connected to the control device, wherein a defined number of second control apparatuses is able to be connected to the second vehicle bus;
wherein the control device is designed to provide a defined minimum functionality during a moving crossing of the vehicle from a defined first region to a defined second region;
wherein the control device is designed to change a functionality for the second control apparatuses during the moving crossing from the defined first region to the defined second region; and
wherein the control device is designed to control coordination of the change of the functionality of the second control apparatuses.

A safe moving transition from the first region to the second region is thereby made possible for the vehicle using a minimum functionality of the control device. On account of the defined change of the functionality of the second control apparatuses, this is able to be performed without jeopardizing safe operation of the vehicle during the transition, with operation of the first control is apparatuses and of the first vehicle bus at the same time being maintained.

An in each case independent functionality is thereby is provided for the vehicle in the individual regions, such that, when a change of region is detected and triggered or detected and verified, the functionality is changed for the respective country.

According to a second aspect, the object is achieved by way of a method for the supraregional operation of a vehicle by means of a system having at least a control device, a first vehicle bus connected to the control device and having a defined number of first control apparatuses connected to the first vehicle bus, and a second vehicle bus connected to the control device and having a defined number of second control apparatuses connected to the second vehicle bus, having the steps:
providing a defined minimum functionality during a moving crossing of the vehicle from a defined first region to a defined second region by means of the control device;
changing a functionality of the second control apparatuses during the moving crossing from the defined first region to the defined second region by means of the control device;
operating the vehicle during the crossing from the defined first region to the defined second region by means of the minimum functionality of the control device.

One preferred embodiment of the system according to the invention is distinguished in that the first vehicle bus of the vehicle is designed to be non-resettable and the second vehicle bus of the vehicle is designed to be resettable. The first control apparatuses are thereby able to act in a stable manner during the moving transition, as a result of which a stable functionality of the first control apparatuses is supported. By virtue of the ability to reset the second vehicle bus, easy reconfiguration of the second control apparatuses may furthermore be performed.

A further preferred embodiment of the system according to the invention is distinguished in that the crossing from the defined first region to the defined second region is able to be input by means of an input apparatus connected to the control device. A start of the moving transition is thereby advantageously able to be signaled to the control device, for example by a drive vehicle driver of the vehicle.

A further preferred embodiment of the system according to the invention is distinguished in that the crossing from the defined first region to the defined second region is able to be signaled to the control device by means of a positioning apparatus, preferably in the form of a GPS sensor and/or of a camera apparatus and/or of a beacon. Further technical means for detecting a change of region are thereby easily provided, as a result of which control software adapted to the new region is made operable for the vehicle.

A further preferred embodiment of the system according to the invention is distinguished in that a non-resettable control apparatus connected to the first vehicle bus comprises at least one defined combination of the following functionalities: support functions for train safety, sanding, braking, driver safety switch, speed recording, speed display.

Said safety-relevant control apparatuses are generally highly sensitive systems that respond in a sensitive manner to a fault on the vehicle bus. On account of the non-resettable design of the first control apparatuses, a fault on the first vehicle bus and said first control apparatuses is largely avoided. The maintenance of essential vehicle functions during the reconfiguration when crossing into the second region is thereby supported.

A further preferred embodiment of the system is distinguished in that a resettable control apparatus connected to the second vehicle bus comprises at least the following functionality: drive control. Different drive controllers may thus be provided for a vehicle-specific control device for the different regions.

A further preferred embodiment of the system according to the invention is distinguished in that at least one of the first control apparatuses and/or the second control apparatuses and/or the control device is designed to be redundant. An even safer moving change of country is thereby able to be achieved for the vehicle.

A further preferred embodiment of the system is distinguished in that it furthermore has a train bus connected to the control device, wherein at least two drive vehicles are connected to the train bus, wherein coordination of a change of functionalities of the second control apparatuses of the drive vehicles is able to be initiated and coordinated by means of the control device. Due to the fact that the control device of the train bus is connected to the control apparatus, an ability to continuously control the drive vehicles is supported. This allows functionalities of the control apparatuses on the train bus to remain permanently active, and as a result minimum required functionalities of the first control apparatuses of all of the vehicles. As a result, a secure multi-traction capability of the vehicle is thereby made possible.

It is considered to be particularly advantageous in the invention that rebooting or reconfiguration of programs that are specific to regions is possible during moving operation of the rail vehicle. Reapproval of control programs that have already been approved may thereby be made far easier since the control programs are used by means of the second control apparatuses in variants that are specific to regions, wherein the control programs are able to be changed and/or exchanged in a manner specific to the region without influencing the functionality of other control programs that are specific to regions.

When a control program for a region is changed, it is therefore not necessary to re-approve the other control programs in other regions.

The above-described properties, features and advantages of the invention and the way in which these are achieved will become clearer and more clearly comprehensible in connection with the following description of the exemplary embodiments that are explained in more detail in connection with two figures.

DETAILED DESCRIPTION OF THE INVENTION

It is proposed to divide an architecture of a vehicle is control system into two different areas each having associated control functionalities. The vehicle may in this case be designed for example as a rail vehicle (locomotive, is drive unit, etc.), a road vehicle, a watercraft, etc. that travels through different regions and in doing so requires different functionalities. A vehicle in the form of a rail vehicle is assumed below.

Figure 1:
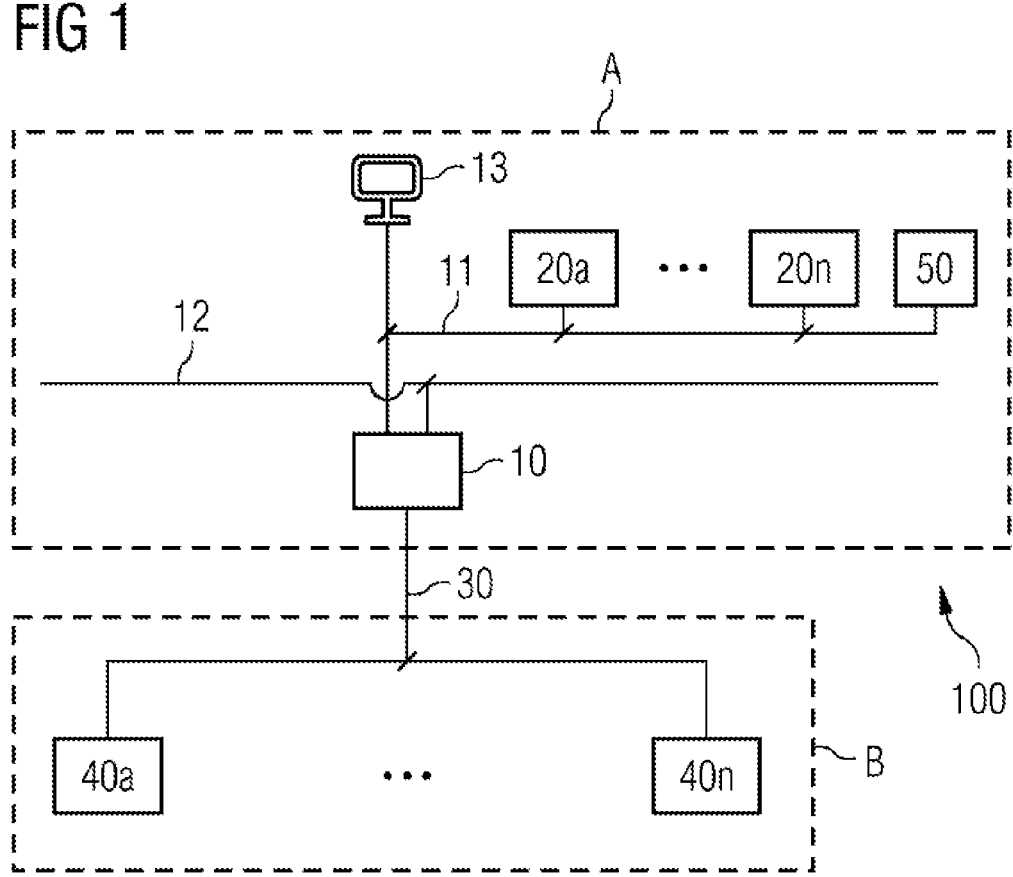
FIG. 1 shows a basic block diagram of one embodiment of the proposed system.

FIG. 1 shows a basic block diagram of one embodiment of a system 100 for the supraregional operation of a vehicle. The vehicle is particularly preferably designed as a rail vehicle, in particular a locomotive, for which different operating specifications exist in different countries, and which therefore must be equipped with a multiplicity of functionalities that are performed by computer apparatuses. In this case, said programs usually have to be certified or approved by the official approval bodies responsible for this.

It is possible to see an area A of the system 100, which area is stable or does not need to be reconfigured during the moving transition and contains all of the components that have to remain stable during said moving transition. The stable area A may contain all of the display elements that are required during the transition by the drive vehicle driver, such as for example a train bus and all of the control devices that have to remain fully functional during operation during the transition. For this purpose, the control device 10 is connected to a first vehicle bus 11, to which a defined number of first control apparatuses 20a ... 20n is connected.

A defined number of first control apparatuses 20a ... 20n are furthermore connected to the control device 10 via the first vehicle bus 11. An input apparatus 13, for example in the form of a terminal, by way of which a user (for example a drive vehicle driver) is able to provide instructions to the control device 10, for example in order to indicate a start of a moving transition, is furthermore connected to the first vehicle bus 11.

The control device 10 is preferably designed as an electronic control computer that provides essential vehicle functions during the moving transition. The control device 10 may for example contain a speed recording, a driver safety switch, a preparation of data for the drive vehicle driver, a provision of data required for the train safety systems, braking and sanding functions, etc.

Also provided in the system 100 is a reconfigurable area B that contains all of the components whose functionality has to be changed in a defined manner during the moving transition, preferably in the form of a reboot or reconfiguration of control software for control apparatuses. For this purpose, the control device 10 is furthermore connected to a second vehicle bus 30.

Said first control apparatuses 20a ... 20n are functionally connected to the control device 10 by means of the first vehicle bus 11 and represent a control system of the vehicle in combination with the second control apparatuses 40a ... 40n connected to the second vehicle bus 30. By way of example, the second control apparatuses 40a ... 40n form region-specific or country-specific drive computers for the vehicle.

A defined number of mutually independent control programs ("control software") are stored in the second control apparatuses 40a ... 40n and are each used for the control apparatuses 40a ... 40n for restricted regions (for example a country or a group of countries) in which the vehicle is operated. The region or the country in which the vehicle is currently situated may be determined by means of a positioning apparatus 50 connected to the first vehicle bus 11. The positioning apparatus 50 may in this case for example be designed as a GPS sensor and/or a camera apparatus and/or a beacon.

Depending on the region in which the vehicle is currently situated, for example upon crossing a border from one country to another, a control program is reloaded into or reconfigured in associated second control apparatuses 40a ... 40n under the supervision of the control device 10. The control device 10 may initiate this reconfiguration or reboot process and also establish that all of the second control apparatuses 40a ... 40n controlled by control programs are in turn synchronous, as a result of which the vehicle is able to be operated in the new region with the control programs that are approved there.

The operation of the vehicle during the moving transition is advantageously thereby able to be performed by means of the minimum control functionality of the control device 10 and optionally additionally by way of the minimum functionality of the first control apparatuses 20a ... 20n.

After the transition has finished, the vehicle is also operated with the functionalities of the second control apparatuses 40a ... 40n.

All of the first control apparatuses 20a ... 20n and/or second control apparatuses 40a ... 40n and/or the control device 10 that are used may be integrated in the control system created thereby either singly or in a redundant configuration.

In the case of redundant use, "reserve devices" are reloaded, ordered activation of these devices taking place starting from a time of operational readiness. The previously active devices then at the same time adopt the role of reserve devices.

The control device 10 may furthermore be connected to a train bus 12 (for example wire train bus WTB, ETB, ZXS). The control device 10 may thereby be connected to all of the drive vehicles of a vehicle assembly, and thereby monitor a reboot or reconfiguration of all of the second control apparatuses of the drive vehicles. A multi-traction capability of the vehicle is thereby advantageously supported.

Essential vehicle functions may advantageously be retained in the event of a software reconfiguration or software reload. Traveling/moving border crossings thereby become possible without interrupting the journey when using different vehicle software in the departure and destination country. By virtue of defining the stable area A, it is possible to continue to operate systems that have long boot or configuration times because they are supplied with data by the control device 10.

The train bus 12 remains operational during the moving transition. A multi-traction capability of the train assembly is therefore advantageously retained. A plurality of vehicles are thereby able to be connected by means of the train bus 12, with reconfigurations of the second control apparatuses being able to be performed and monitored by means of the control device 10.

It is thereby possible for example to provide and approve individual control programs for the respective regions or countries without in each case having to certify all of the control software again in each case to all of the individual approval authorities. As a result, simplified and inexpensive use and management of the control software of the vehicle is thereby supported.

A comfortable and safe moving transition of the vehicle is ultimately thereby advantageously possible. Efficient and economic use or management of said control software of the second control apparatuses 40a ... 40n is thereby made possible.

As a result, country-specific or region-specific control programs for the vehicle are able to be used easily by way of the proposed system 100. This advantageously results in decoupling from national specifications and approval authorities.

As a result, the control system, in the manner described above, has a monitoring function in the form of the control device 10 that initiates, coordinates and monitors the reloading or rebooting of the control programs of the second control apparatuses 40a ... 40n.

The reloading of the programs into the respectively associated second control apparatuses 40a ... 40n may be initiated as follows:

a) manually by a drive vehicle driver operating the input apparatus 13,
b) triggered automatically by the positioning apparatus,
c) a combination of variants a) and b), a kind of fallback position being provided by variant a) in this case. This is useful for example for a case in which the GPS signal is not present without errors or a surroundings recognition camera is not functioning properly.

By virtue of the invention, the control software is advantageously able to be tailored exactly to country specifications, as a result of which functions that are not relevant to a country and whose safe deactivation does not have to be verified are not present. This advantageously results in a reduced software complexity and a reduced risk of cost-intensive side effects that are discovered too late, which advantageously results in shorter software development times. An increase in the reusability of control software is furthermore advantageously achieved. A risk of driving the vehicle into a country with incorrect parameters and/or incorrect functions is furthermore advantageously reduced.

Figure 2:
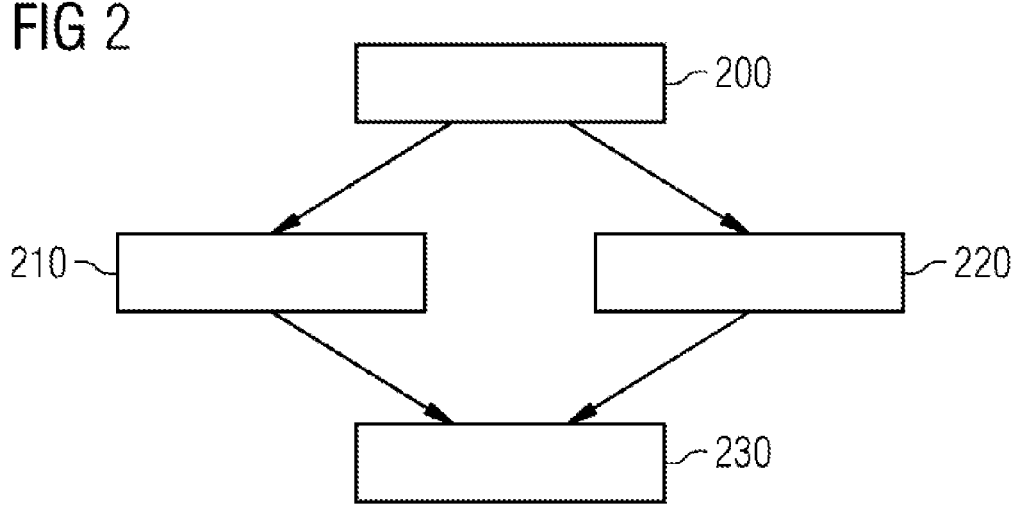
FIG. 2 shows a basic flowchart of a proposed method for the supraregional operation of a vehicle.

FIG. 2 shows a basic flowchart of one embodiment of the method according to the invention for the supraregional operation of a vehicle.

In a step 200, a defined minimum functionality during a moving crossing of the vehicle from a defined first region to a defined second region is provided by means of the control device 10.

In a step 210, a functionality for the second control apparatuses 40a ... 40n during the moving crossing from the defined first region to the defined second region is changed by means of the control device 10.

In a step 220 that runs in parallel with step 210, the vehicle is operated during the crossing from the defined first region to the defined second region by means of the functionalities of the first control apparatuses 20a ... 20n.

In a step 230, the vehicle transitions or returns to normal operation after the reconfiguration during the moving transition has finished.

A time of around 90 seconds to around 120 seconds is preferably provided to completely reboot the second control apparatuses 40a ... 40n during the moving transition, such that an ordered reconfiguration of the functionalities of the second control apparatuses 40a ... 40n is possible in this time.

In summary, the present invention proposes a system or a specific architecture of a system and a method that easily allow supraregional operation of a vehicle. A safe moving transition is advantageously made possible by means of the invention. Software is advantageously able to be provided and used without complex parameterization by means of the proposed method, as a result of which susceptibility to errors and multiple implementation of identical functions is largely avoided.

Although the invention has been described and illustrated in more detail through preferred exemplary embodiments, the invention is not restricted by the disclosed examples, and other variations may be derived therefrom by those skilled in the art without departing from the scope of protection of the invention.

The invention claimed is:

1. A system for a supraregional operation of a vehicle, comprising:
   a control device;
   said control device being configured for connection to a first vehicle bus, and wherein a defined number of first control apparatuses are connectable to the first vehicle bus; and
   said control device being configured for connection to a second vehicle bus, and wherein a defined number of second control apparatuses are connectable to the second vehicle bus;
   said control device being configured to provide a defined minimum functionality during a rolling cross-over of the vehicle from a defined first region to a defined second region by maintaining an operation of the first control apparatuses and of the first vehicle bus;
   said control device being configured to change a functionality for the second control apparatuses during the rolling cross-over from the defined first region to the defined second region; and
   said device being configured to control a coordination of a change of the functionality of the second control apparatuses.

2. The system according to claim 1, wherein the first vehicle bus of the vehicle is a non-resettable bus and the second vehicle bus of the vehicle is a resettable bus.

3. The system according to claim 1, wherein an input apparatus is connected to the control device for enabling the cross-over from the defined first region to the defined second region to be input into the control device.

4. The system according to claim 1, wherein said control device is configured to receive signal information of the cross-over from the defined first region to the defined second region from a positioning apparatus.

5. The system according to claim 4, wherein the signal information to be signaled to the control device is generated by at least one positioning apparatus selected from the group consisting of a GPS sensor, a camera apparatus, and a beacon.

6. The system according to claim 1, wherein a non-resettable control apparatus connected to the first vehicle bus comprises at least one defined combination of functionalities selected from the group consisting of: support functions for train safety, sanding, braking, driver safety switch, speed recording, and speed display.

7. The system according to claim 6, wherein a resettable second control apparatus is connected to the second vehicle bus and contains at least a drive control functionality.

8. The system according to claim 1, wherein at least one of the first control apparatuses, the second control apparatuses, or the control device is redundant.

9. The system according to claim 1, further comprising a train bus connected to said control device, wherein at least two drive vehicles are connected to the train bus, and wherein the coordination of the change of functionalities of the second control apparatuses of the drive vehicles is initiated and coordinated by said control device.

10. A method for a supraregional operation of a vehicle, the method comprising:
    providing a system for the supraregional operation of the vehicle, the system having a control device; a first vehicle bus connected to the control device and a defined number of first control apparatuses connected to the first vehicle bus; and a second vehicle bus connected to the control device and a defined number of second control apparatuses connected to the second vehicle bus;
    providing with the control device a defined minimum functionality during a moving cross-over of the vehicle from a defined first region to a defined second region, while maintaining an operation of the first control apparatuses and of the first vehicle bus;
    changing with the control device a functionality of the second control apparatuses during the moving cross-over from the defined first region to the defined second region;
    operating the vehicle during the cross-over from the defined first region to the defined second region with the minimum functionality of the control device; and
    subsequently transitioning to a normal operation of the vehicle.

11. The method according to claim 10, which comprises controlling the functionalities of the first control apparatuses and of the second control apparatuses by way of control programs.

12. A non-transitory computer program product comprising program code for executing the method according to claim 10 when the program code runs on a control device for the supraregional operation of a vehicle.

13. The non-transitory computer program product according to claim 12 stored on a computer-readable data carrier.

* * * * *